United States Patent [19]
Ritter

[11] 3,738,682
[45] June 12, 1973

[54] CLOSE COUPLED PULLING HITCH ASSEMBLY

[76] Inventor: Orville A. Ritter, 1401 Oklahoma Boulevard, Alva, Okla. 73717

[22] Filed: Nov. 30, 1971

[21] Appl. No.: 203,269

[52] U.S. Cl. .............................. 280/413, 280/412
[51] Int. Cl. ........................................ B62d 53/00
[58] Field of Search ....................... 280/412, 413; 172/201, 202, 313, 314, 667

[56] References Cited
UNITED STATES PATENTS

| 1,877,650 | 9/1932 | Eakin | 280/412 |
| 2,515,016 | 7/1950 | McClintock | 172/314 X |
| 2,709,085 | 5/1955 | Stueland | 280/412 |
| 3,008,732 | 11/1961 | Rancy | 280/412 |
| 3,343,849 | 9/1967 | Priddy | 280/412 |
| 3,522,860 | 8/1970 | Purrer | 180/14 R |

Primary Examiner—Leo Friaglia
Attorney—Jerry J. Dunlap, William R. Laney, Robert M. Hessin et al.

[57] ABSTRACT

A close coupled pulling hitch assembly including a horizontally extending, transverse draw bar, hitch means on one side of the draw bar for connecting a self-propelled vehicle thereto and coupling means on the opposite side of the draw bar for connecting a first agricultural implement to the draw bar. Pivotally connected to one or both end portions of the transverse draw bar is at least one side bar which is connected for pivotation about a substantially horizontal axis. A generally horizontally extending coupling bar is connected to each of the side bars, and is horizontally spaced from the transverse draw bar to accommodate the first described agricultural implement. Coupling means is provided on each coupling bar for coupling thereto, an agricultural implement disposed on the opposite side of the respective coupling bar from the transverse draw bar. Means is provided for pivoting each side bar and its associated coupling bar about a substantially vertical axis and relative to the transverse draw bar to laterally displace the agricultural implements coupled to the coupling bars relative to the agricultural implement coupled to the draw bar. Ground engaging wheels are mounted on at least one of the described bars.

19 Claims, 12 Drawing Figures

CLOSE COUPLED PULLING HITCH ASSEMBLY

BACKGROUND OF THE INVENTION

1. Field of the Invention

This invention relates to implement carrying frames functioning to permit a plurality of agricultural implements to be drawn by a single tractor or other self-propelled vehicle, and more particularly, to hitches or coupling frames for permitting a plurality of implements to be alternately drawn by a with respect tractor in a status in which the implements are disposed one behind the other for over-the-road transport, or are horizontally offset withrespect to each other to afford maximum coverage during in-the-field usage.

2. Brief Description of the Prior Art

With the evolution of agricultural tractors developing great power and able to pull heavy earth working implements, or many of such implements, various structures have been concurrently developed to permit several implements to be simultaneously pulled behind the tractor in fore-and-aft alignment at such time as the tractor is transporting the implements over highways, and in cross country fashion to the fields and for then spacing or staggering the implements with respect to each other for covering maximum area when towed behind the tractor in the field. Various types of frameworks and hitches have been proposed for this purpose of providing dual over-the-road transport of the implements, and in-the-field spreading or staggering of the implements. Thus, in Danish Patent 88,121, there is disclosed a framework to be drawn behind the tractor and carrying a pair of arms pivotal about vertical axes on this framework. The arms can be extended rearwardly from the tractor and coupled to implements aligned in fore-and-aft fashion for over-the-road travel, or may be pivoted outwardly in opposite directions to permit a plurality of implements to be staggered or offset in a horizontal sense with respect to the direction of travel of the tractor. It is proposed to accomplish the movement of the multiple implement supporting arms manually or with cables, and to lock these arms in place in the same way. No automatic control from the tractor per se is provided for the purpose of changing the status of the implements in relation to each other.

One of the problems posed by the Danish multiple implement coupling arrangement is that when the several implements are in their aligned fore-and-aft status for over-the-road travel, a substantial space necessarily exists between the first and second implements causing the overall length of the array to be substantial, and to constitute a hazardous impediment to vehicular traffic on a highway over which the implements are moved.

A more recent proposal for coupling a plurality of implements behind a self-propelled vehicle in the two statuses described, i.e., over-the-road and in-the-field, is shown in Bartel U.S. Pat. Nos. 2,971,774 and 3,112,124. In the case of the Bartel assembly, the framework which carries the plurality of implements must be disconnected from the tractor and shifted in its orientation in order to change from a tandem fore-and-aft alignment status of the implements to a laterally offset, in-the-field status.

Other multiple implement arrangements include those shown in Eakin U.S. Pat. No. 1,877,650; Raney U.S. Pat. No. 3,008,732; Purrer et al. U.S. Pat. Nos. 3,522,860 and Johnson Reissue U.S. Pat. No. 19,550.

BRIEF DESCRIPTION OF THE PRESENT INVENTION

The present invention comprises an improved close coupled pulling hitch assembly by which a plurality of agricultural implements can be very closely coupled behind a tractor or other self-propelled vehicle in direct fore-and-aft alignment for over-the-road travel, and then may be automatically moved to laterally staggered or offset positions in relation to each other so that maximum ground coverage is afforded by the implements during in-the-field usage. The invention may be broadly described as an articulated framework adapted for connection to a self-propelled vehicle and including a generally horizontally extending transverse draw bar disposed toward a forward end of such framework. The draw bar carries hitch means for connecting the framework to the self-propelled vehicle. Coupling means is provided on the opposite side of the draw bar from the hitch means to facilitate connection of the draw bar to a first agricultural implement.

Spaced along the draw bar from the coupling means is at least one side bar which extends rearwardly from the transverse draw bar, and is connected to the transverse draw bar for pivotation about a substantially vertical axis. A generally horizontally extending coupling bar is connected to and movable with each of the side bars, and is horizontally spaced from the transverse draw bar by a distance sufficient to accommodate one or more agricultural implements between the respective horizontally extending coupling bar and the transverse draw bar. Coupling means is provided on each of the coupling bars for coupling thereto an agricultural implement disposed on the opposite side of the respective coupling bar from the transverse draw bar. Means is provided for automatically pivoting each of the side bars about a substantially vertical axis and relative to the transverse draw bar to laterally displace agricultural implements coupled to the coupling bars relative to the agricultural implement coupled to the draw bar. Ground engaging wheels are mounted on at least one of the bars of the framework for supporting the pulling hitch assembly on the ground.

It is an important object of the present invention to provide a close coupled pulling hitch assembly which may be used to attach behind a self-propelled agricultural vehicle, a plurality of agricultural implements in a fore-and-aft alignment directly behind the vehicle, or alternately, in laterally offset, staggered array for obtaining maximum coverage and utilization in the field.

An additional object of the present invention is to provide a close coupled pulling hitch assembly for connection to a self-propelled agricultural vehicle and to a plurality of agricultural implements, with the hitch assembly being articulated and actuated so that the implements may be automatically moved between a position of alignment directly behind the tractor and a staggered or offset position for in-the-field use.

An additional object of the present invention is to provide a mechanically sturdy, easily used close coupled pulling hitch assembly for attaching a plurality of agricultural implements behind a tractor, which close coupled pulling hitch assembly is characterized in having a long and trouble free operating life.

Additional objects and advantages of the invention will become apparent as the following detailed descrip- 3,738,682

BRIEF DESCRIPTION OF THE DRAWINGS

FIG. 6 is a plan view of a different embodiment of the close coupled pulling hitch assembly of the invention.

FIG. 7 is a side elevation view of the embodiment of the invention illustrated in FIG. 6.

FIG. 8 is an enlarged detail view, in plan, of a portion of the embodiment of the close coupled pulling hitch assembly illustrated in FIGS. 6 and 7.

FIG. 9 is an enlarged detail view, in side elevation, of a portion of the embodiment of the close coupled pulling hitch assembly illustrated in FIGS. 6 and 7.

the invention 11 is a plan view of the embodiment of theillustrated in FIG. 6 in use for towing three agricultural vehicles directly behind an agricultural tractor.

DETAILED DESCRIPTION OF PREFERREDEMBODIMENTS OF THE INVENTION

Figures 1, 3:
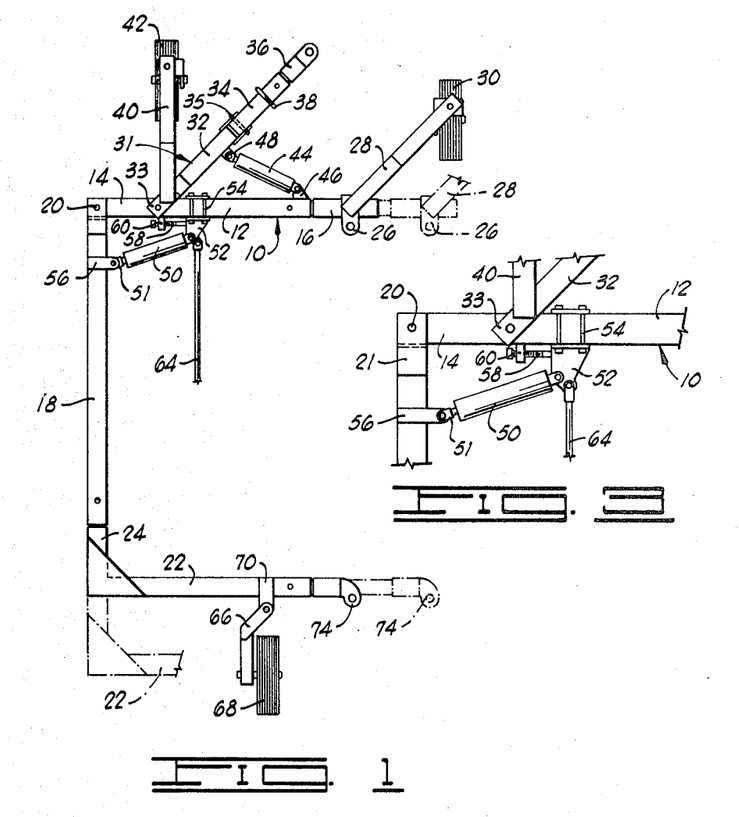
FIG. 1 is a plan view of one embodiment of the close coupled pulling hitch assembly of the invention. An alternate operating position of the assembly is shown in dashed lines.
FIG. 3 is an enlarged detail view, in plan, of a portion of the embodiment of the close coupled pulling hitch assembly illustrated in FIGS. 1 and 2.

Referring initially to FIG. 1 of the drawings, shown therein is a close coupled pulling hitch assembly constructed in accordance with the invention. The pulling hitch includes an elongated, transversely extending draw bar designated generally by reference numeral 10. The transverse draw bar 10 may be made as a single, elongated, integral structural unit, but preferably includes a first beam 12 which has a second beam 16 slidably connected to one end thereof. The beam 16 is connected to a necked down extension which extends telescopingly into the beam 12 to permit the beam 16 to be extended outwardly to the dashed line position shown in FIG. 1 for a purpose hereinafter described. A suitable pin is provided for locking the beam 16 in this extended position.

Figure 2:
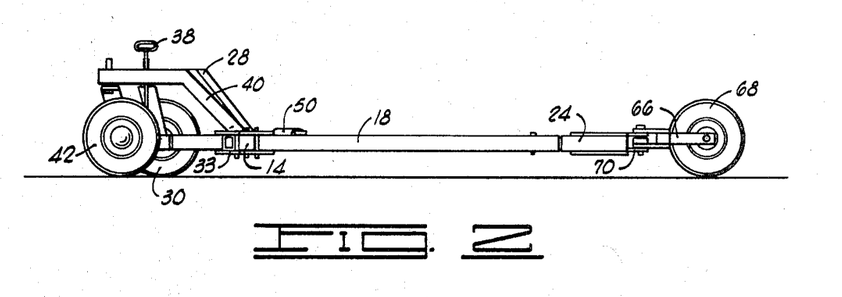
FIG. 2 is a side elevation view of the embodiment of the invention illustrated in FIG. 1.

Pivotally connected to the end of the beam 12 opposite its end connected to the beam 16 is a side bar 18 which projects, in the position shown in FIG. 1, at a right angle to the draw bar 10 constituted by the aligned beams 12 and 16. The side bar 18 is pivotable about a vertical axis extending through a pivot pin 20 used for connecting spaced flanges 21 secured to the side bar to the end of the beam 12 (see FIG. 2). A generally horizontally extending coupling bar 22 has a projection 24 extending normal thereto into the side bar 18 in sliding, telescoping engagement therewith. This engagement permits the coupling bar 22 and projection 24 to be extended outwardly from the side bar 18 to the dashed line position shown in FIG. 1.

Secured to the beam 16 of the transverse draw bar 10 is a coupling bracket 26 to facilitate the coupling of a first agricultural implement, such as a seed drill, disc or the like, to the transverse draw bar 10. A first cantilevered support beam 28 is secured to the beam 16 and projects therefrom at an acute angle and carries at its free end, a caster wheel 30 for supporting the close coupled pulling hitch assembly of the invention on the ground.

Spaced transversely along the transverse draw bar 10 from the support beam 28 is a hitch means 31 which includes a hitch arm 32 having a bifurcated hitch bracket 33 at one of its ends for pivotally connecting the coupling arm to the beam 12 forming a portion of the transverse draw bar 10. At its opposite end, the hitch arm 32 is pivotally connected to a hitch element 34 which carries a hitch bracket 36 at its end facilitating coupling the close coupled pulling hitch assembly to a tractor or other self-propelled vehicle. The hitch element 34 has secured to the upper side thereof, an upwardly extending, hydraulic fluid conduit fair lead element 38 which has a ring or loop at the upper end thereof for guiding and retaining hydraulic fluid conduits extended rearwardly to the close coupled pulling hitch assembly from the tractor.

Secured to the hitch arm 32 for movement therewith is a cantilevered arm 40 which carries at its free outer end, a caster wheel 42. The cantilevered arm 40 is secured to the hitch arm 32 for movement therewith when the hitch arm is pivoted about its vertical pivotal axis extending through the pivot pin by which it is connected to the beam 12.

For the purpose of selectively positioning and pivoting the hitch arm 32 and the cantilevered arm 40 in relation to the transverse draw bar 10, a hydraulic cylinder 44 is provided, and has one of its ends connected to a mounting bracket 46 carried in the center of beam 12. The piston rod 48 of the cylinder 44 has its free end connected to a bracket carried on the hitch arm 32. When the piston rod 48 is extended from the cylinder 44, the hitch means 31 by which the close coupled pulling hitch assembly is hitched to a tractor, and also the cantilevered arm 40 and caster wheel 42, are pivoted to the left from the position shown in FIG. 1 of the drawings. The purpose of this movement will be hereinafter explained in greater detail.

For the purpose of pivoting the side bar 18 about the pivotal axis extending through the pivot pin 20, a hydraulic cylinder 50 is interposed between the side bar and the transverse draw bar 10. The cylinder 50 has one end connected to a mounting bracket 52 which is movably secured on the beam 12 by a plurality of bolts 54 and clamp plates. A piston rod 51 projects from the opposite end of the cylinder 50 and is connected to a bracket 56 secured to the side bar 18. The point of attachment of the cylinder 50 to the beam 12 can be adjusted, for purposes hereinafter explained, by loosening the bolts 54 and adjusting an adjusting screw 58 extended through a plate 60 secured to the beam 12 to move the bracket 52 in an axial direction along this beam. (See FIG. 3). A stabilizer bar 64 is pivotally connected to the bracket 52 and projects rearwardly therefrom. The stabilizer bar 64 is adapted for connection to one side of an agricultural implement, such as a seed drill or the like, which is coupled to the coupling bracket 26 (this arrangement is best illustrated in FIGS. 4 and 5 of the drawings).

Pivotally secured to the coupling bar 22 near its end which is most remote from the side bar 18 is a cantilevered wheel supporting arm 66. This arm 66 carries at its free end, a ground engaging wheel 68. The wheel supporting arm 66 is pivotally connected to a bracket 70 secured to the coupling bar 22 for pivotation about a vertical axis. At the free end of the coupling bar 22, a bifurcated coupling bracket 74 is provided for coupling an agricultural implement to the close coupled pulling hitch assembly as hereinafter described.

OPERATION

Figures 4, 5, 10:
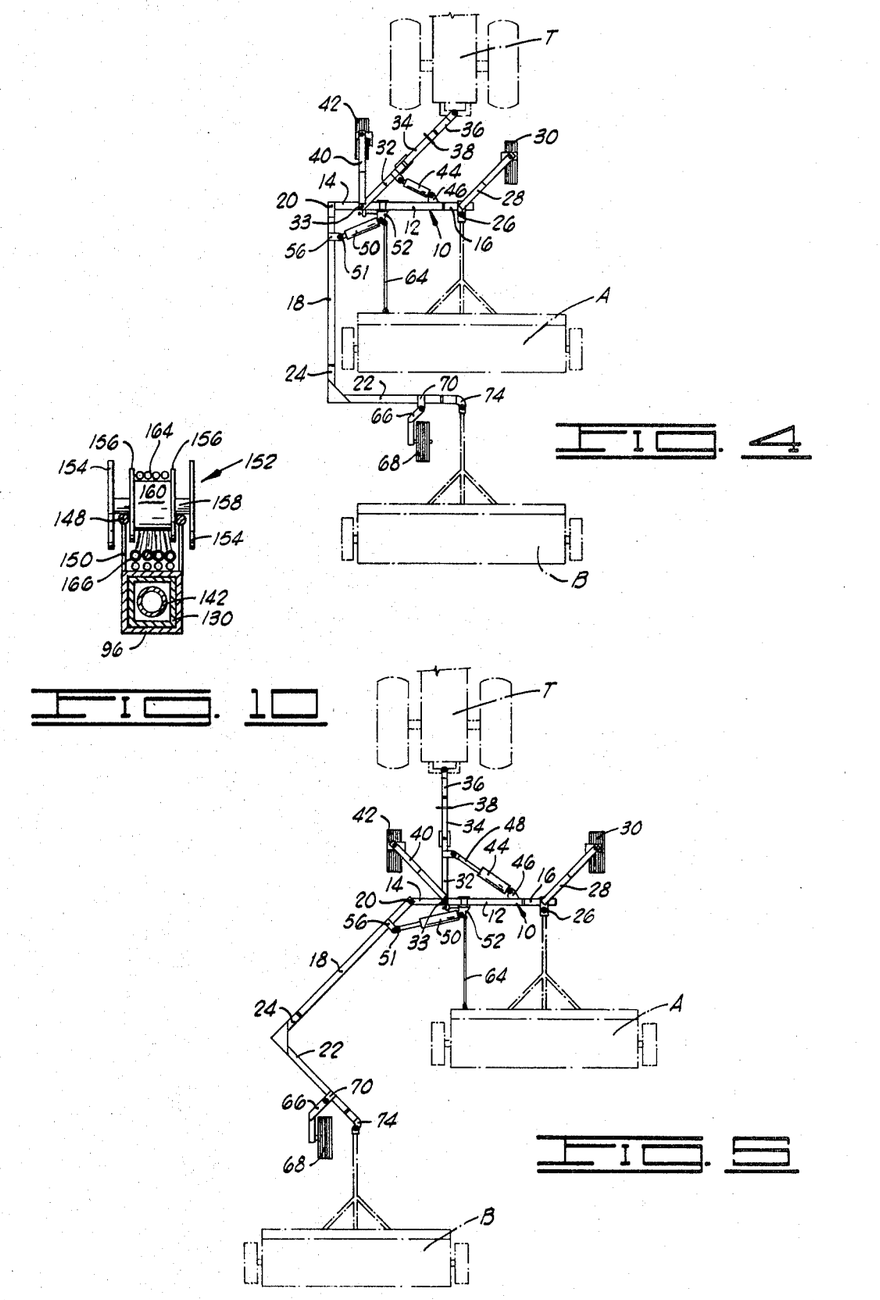
FIG. 4 is a plan view of the pulling hitch assembly of the invention in use for towing a pair of agricultural implements directly behind an agricultural tractor.
FIG. 5 is a plan view of the structures illustrated in FIG. 4, but illustrating the hitch assembly and implements in the status they occupy when the implements are in use in the field.
FIG. 10 is a sectional view taken along line 9—9 of FIG. 8.

The use and operation of the close coupled pulling hitch assembly of the invention can best be perceived by referring to FIGS. 4 and 5 of the drawings. In these figures, a conventional agricultural tractor is designated by reference character T and is shown in dashed lines. The tractor is connected to the close coupled pulling hitch assembly by means of the hitch bracket 36 which is secured by a suitable pin to an appropriate point of connection at the rear of the tractor T. The hitch bracket 36 is pivotally connected to the hitch element 34 through a pivotal connection 35 which permits pivotation of these elements relative to each other about a horizontal axis. The tractor T can thus move up and down relative to the hitch and implements when traversing uneven land. There is further shown in FIG. 4, a pair of agricultural implements designated by reference characters A and B. The leading or forwardmost implement A is connected through a suitable hitch frame, which is conventionally provided thereon, to the coupling bracket 26 carried at the free end of the transverse draw bar 10. In order to stabilize the agricultural implement A, and prevent yawing of this implement due to variations in the resistance offered to its forward travel by the terrain which it crosses, the stabilizer bar 64 is connected between the mounting plate 52 and a suitable point of connection on the implement A. The stabilizer bar is free to pivot about a horizontal axis at its point of connection to the implement A so that vertical movement of the end of the implement to which it is connected can be accommodated without bending or distortion of the stabilizer bar.

It will be noted in referring to the status of the close coupled hitch assembly depicted in FIG. 4 of the drawings that the side bar 18 is sufficiently far displaced in a lateral sense from the fore-and-aft line through the coupling bracket 26 that ample room is provided for the accommodation of the implement A. The status of the assembly depicted in FIG. 4 will be hereinafter referred to as the over-the-road status. In this status, the agricultural implements A and B are arrayed in fore-and-aft alignment and occupy a minimum transverse width. Moreover, the tractor T is positioned almost directly ahead of the center line through the two agricultural implements, and is not offset or laterally displaced to one side or the other of either of the implements. The implement B is connected to the coupling bracket 74 so that it tracks directly behind the implement A. The caster wheels 30 and 42 and the wheel 68 function to provide the ground support for the implements carried by the close coupled pulling hitch, and, of course, each of the implements carries its own wheels at opposite ends thereof (shown in dashed lines).

Before proceeding with a description of the usage and operation of the close coupled pulling hitch assembly, it should be pointed out that the telescoping engagement of the beam 16 with the beam 12 in the transverse draw bar assembly 10 permits the beam 16 to be extended outwardly so to further tofurther displace the coupling bracket 26 from the side bar 18. A larger agricultural implement having a wider transverse dimension can then be accommodated. The same is true of the relationship of the extension of the coupling bar 22 which carries the coupling bracket 74. This portion of the coupling bar may be pulled out or extended to the dashed line position shown in FIG. 1 so that an agricultural implement of a larger size may be accommodated. In some cases, the leading implement A which is to be coupled to the coupling bracket 26 may be too large, in a fore-and-aft or front-to-rear sense, to be accommodated in the space between the transverse draw bar 10 and the coupling bar 22. In this event, the coupling bar may be extended rearwardly by pulling the coupling bar 22 and its projection 24 out of the side bar 18, using the telescoping connection between the projection and the side bar to accomplish this extended status. It will be understood, of course, that appropriate pin holes are provided to lock the various telescoping components in the position to which they are adjusted when such adjustment is necessary to accommodate agricultural implements of varying sizes.

As has been previously explained, the arrangement of agricultural implements A and B with respect to the close coupled pulling hitch of the invention and the tractor T as shown in FIG. 4 is that status or arrangement which is used in transporting the implements over the road from one field to another. When the field is reached where the implements are to be utilized, it is then desirable to stagger or offset the two implements A and B in a transverse or lateral sense with respect to their direction of movement so that maximum coverage of the earth is obtained with each pass of the tractor T across the field. In order to achieve this status of the implements A and B, the hydraulic cylinders 44 and 50 are simultaneously charged with hydraulic fluid to cause the extension of the piston rods 48 and 51 therefrom.

When this occurs, the hitching means 31 constituted by the hitch element 34 and hitch bracket 36 is displaced or pivoted toward the left so that it moves to the position shown in FIG. 5. At the same time, the cantilevered arm 40 carried on the hitch arm 32 is pivoted toward the left by an equivalent amount, and the caster wheel 42 carried thereon will, of course, realign in a fore-and-aft direction to track behind the tractor T. It will be seen that the effect of the extension of the piston rod 48 in the manner described is to re-orient the hitch assembly relative to the remainder of the close coupled pulling hitch so that the tractor T will be offset from its prior position, and will be positioned ahead of the left side of the implement A.

Concurrently with the actuation of the hydraulic cylinder 44, the hydraulic cylinder 50 is actuated to extend the piston rod 51 therefrom. This causes the side arm 18 to pivot toward the left about the pivot pin 20, and to enlarge the angle formed between the side arm and the transverse draw bar 10. This pivotal movement of the side arm 18 results in a concurrent pivotal movement of the coupling bar 22, which is rigidly secured thereto, so that the coupling bar is moved rearwardly and leftwardly to the position depicted in FIG. 5 of the drawings. It will now be perceived that through the actuation of the hydraulic cylinders 44 and 50, the alignment of tractor T, implement A and implement B has been changed so that implements A and B are transversely staggered or offset with respect to each other, and cover, in a transverse sense, a path across the field which is as wide as the sum of the collective widths of the implements A and B. Moreover, the tractor T has been repositioned so that it is aligned with a central axis passing through the left side of the implement A and the right side of the implement B, and the total drag forces which the tractor must overcome are centered directly behind the tractor.

The close coupled pulling hitch assembly of the invention has the advantage over those types of similar devices hereinbefore proposed that the change of status of the pulling hitch of the present invention from an over-the-road to an in-the-field status can be accomplished automatically from the tractor vehicle. No disconnection of the implements from the pulling hitch is required in order to attain the change in status sought. Moreover, in the over-the-road status, the implements A and B are very closely coupled to the tractor and occupy a minimum overall length, and therefore reduce the safety hazard constituted by the movement of the assembly along the highway.

An alternate embodiment of the invention is illustrated in FIGS. 6–12 of the drawings. This embodiment, as contrasted with that shown in FIGS. 1–5, is constructed to facilitate the hitching of three agricultural implements to a tractor or other self-propelled vehicles and the alternate positioning of these vehicles either in an over-the-road or in-the-field status.

Referring initially to FIGS. 6 and 7 of the drawings, the close coupled pulling hitch assembly of the invention shown therein includes a transverse draw bar 80 which, in the illustrated embodiment, includes an elongated beam 82 having a terminal beam 83 pivotally connected thereto in longitudinally aligned end-to-end relation. A splicing member 85 interconnects beams 82 and 83 and permits the beam 83 to be rotated relative to the beam 82 about a horizontal axis extending coincidentally with the aligned axes of those beams. Beam 82 has a hitch means 84 positioned on the forward side thereof for connection of the close coupled pulling hitch assembly to a tractor. The hitch means includes a Y-shaped yoke member 86 which is pivotally connected to the brackets 88 secured on the forward side of the beam 82 and which carries at its forward end, a clevis bracket 90 for connection to the tractor by means of a suitable pin. Near the opposite ends of the beam 82 are a pair of cantilevered caster wheel support members 92. A pair of caster wheels 93 is supported at the forward free ends of each of these members. Pivotally connected to the opposite ends of the beams 83 and 82 are a first side bar 94 and a second side bar 96. The side bars 94 and 96 are pivotally connected to the beams 83 and 82, respectively, by means of paired, vertically spaced flanges 97 and pivot pins 98 in a manner hereinbefore described in referring to the embodiment appearing in FIGS. 1–5. A coupling bracket 95 is secured to the beam 82 for coupling an agricultural implement thereto.

For the purpose of pivoting the side bars 94 and 96 about the ends of the respective beams 83 and 82 to which they are connected, a pair of actuating assemblies 100 and 102 is connected between the beams and the two side arms similarly to the arrangement in the embodiment of the invention previously described. Each of the actuating assemblies includes a hydraulic cylinder 104 which is pivotally connected at one of its ends to a mounting bracket 106. The mounting bracket 106 is slidably connected to the beam by means of bolts and clamp plates 108, and the position of each mounting plate 106 along the beam can be adjusted by means of the adjusting screw 110 which extends through a plate 112 and is in threaded engagement therewith. A piston rod 114 extends from each of the cylinders 104 and is pivotally connected to a plate 116 secured to the respective side bar 94 or 96 near the forward end thereof. A stabilizer bar 117 is pivotally connected at one of its ends to one of the mounting brackets 106 and is adapted for connection at its other end to an agricultural implement for the purpose hereinbefore described.

At the end of the side bar 94 opposite its end which is pivotally connected to the beam 83, the side bar has secured thereto a forward coupling bar 120. The forward coupling bar 120 extends substantially normal to the side bar 94 and carries at its inner end, a coupling bracket 122 to which a second agricultural implement may be pivotally connected. Intermediate the coupling bracket 122 and the point of connection of the side bar 94 to the coupling bar 120, the coupling bar carries a mounting plate 124 to which is pivotally connected a wheel supporting arm 126 for pivotation about a vertical axis. The wheel supporting arm 126 carries a ground engaging wheel 128.

The side bar 96 is a tubular or channel shaped member which telescopingly receives a side bar extension 130 which can be extended from, or retracted into, the side bar 96. In FIG. 6 of the drawings, the side bar extension 130 is shown in its fully extended position which is utilized in towing several of the agricultural vehicles in aligned status for over-the-road travel. At its free, rearward end, the side bar extension 130 has secured thereto, andd projecting normally therefrom, a rear coupling bar 132. The rear coupling bar 132 has secured to its inner end a coupling bracket 134, and is provided intermediate its length with a mounting plate 136 to which is pivotally secured a wheel supporting arm 138 carrying a ground engaging wheel 140.

For the purpose of permitting and facilitating the extension and retraction of the side bar extension 130 from the side bar 96, the extension 130 is made of a hollow or tubular configuration and carries enclosed therein, an elongated hydraulic cylinder. This cylinder is shown in dashed lines in FIG. 9 of the drawings and is designated by reference numeral 142. The cylinder has one end secured within the most rearward end of the side bar extension 130 and projects forwardly in the side arm extension toward the side arm 96. The cylinder carries a piston rod 144 which is extendable from the cylinder 142 and which has its free end connected to the end of the side bar 96 adjacent the spaced flanges 97 by which this side bar is pivotally attached to the beam 82. For the purpose of extending the side bar extension 130 from the side bar 96 so as to attain the status of these members depicted in FIG. 6, hydraulic fluid is delivered to the cylinder 142 to extend the piston rod 144 and thus cause the extension 130 to be extended from the side bar 96.

In order to permit the conduits carrying actuating hydraulic fluid to and from the cylinder 142 to be extended and retracted with the side bar extension 130, a reel mechanism is provided on the side bar 96 and is shown in detail in FIG. 8. The reel mechanism includes a trackway formed by a pair of rods 148 which is supported on a plurality of posts 150 welded to the sides of the side bar 96 and projecting upwardly therefrom. A reel, designated generally by reference numeral 152, is rollably mounted on the rods 148, and includes a pair of outer flanges 152 and a pair of inner flanges 156 spaced inwardly from the outer flanges. The outer flanges 154 are secured to a shaft 158 which extends through an opening in the inner flanges 156. The inner flanges 156 and a drum 160 carried therebetween are thus free to rotate on the shaft 158. A suitable torsion spring (not shown) is mounted inside the drum 160, and is connected between this drum and the shaft 158 to continuously resiliently bias the shaft 158 and the reel assembly carried thereby toward the forward end of the side bar 96.

Extending over the drum 160 so as to be configured in a U-shaped configuration are a plurality of hydraulic conduits 164. In the illustrated embodiment, four of these conduits are shown as enclosed in a harness, and two of them are utilized to supply hydraulic fluid to the cylinder 142 and to return hydraulic fluid therefrom to the supply system on the tractor (not shown). The other two conduits are provided for supplying hydraulic power to an agricultural implement connected to the coupling bracket 134. After the conduits 164 have been extended around the drum 160, they are extended back along the upper side of the side bar 96 and one end of each conduit is connected to a metallic coupling or nipple 166 which is mounted on the upper side of the side bar 96 adjacent the rear end thereof. Hydraulic fluid is supplied to the couplings or nipples 166 by a plurality of rigid metallic supply lines 170 which are secured on the upper side of the side bar 96 (see FIG. 9).

In order to prevent chaffing and binding of the side bar extension 130 during its reciprocating movement into and out of the side bar 96, a pair of lever arms 172 are pivotally secured on opposite sides of the side bar 96, and project a short distance beyond the rear end thereof. These lever arms 172 carry between them, a shaft upon which is mounted a small roller 178, and this roller bears against the upper surface of the side bar extension 130. The forward ends of the lever arms 172 are pivoted upwardly by an adjusting screw 179 so as to force the roller 178 downwardly against the upper side of the side bar extension 130 and prevent it from binding upon the upper edge of the opening into the side bar 96 as the side bar extension reciprocates.

Figure 11:
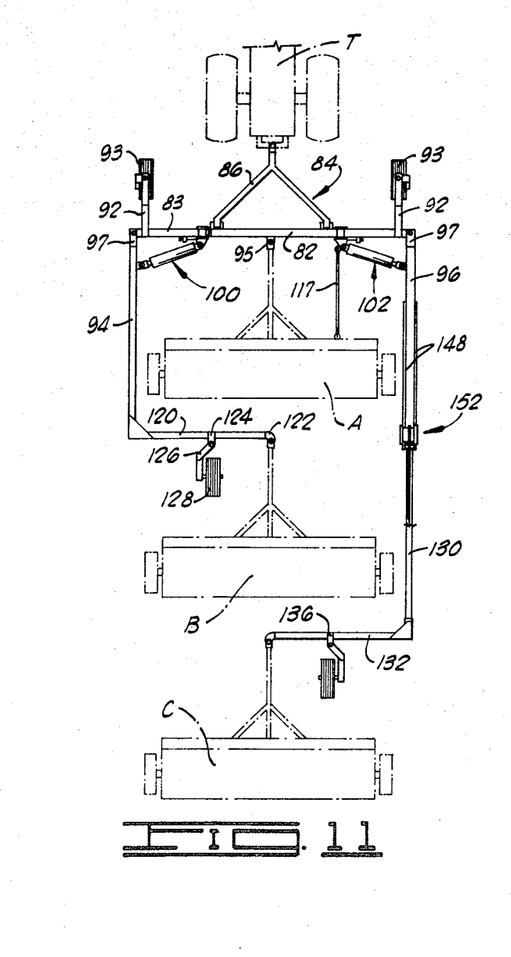
Figure 12:
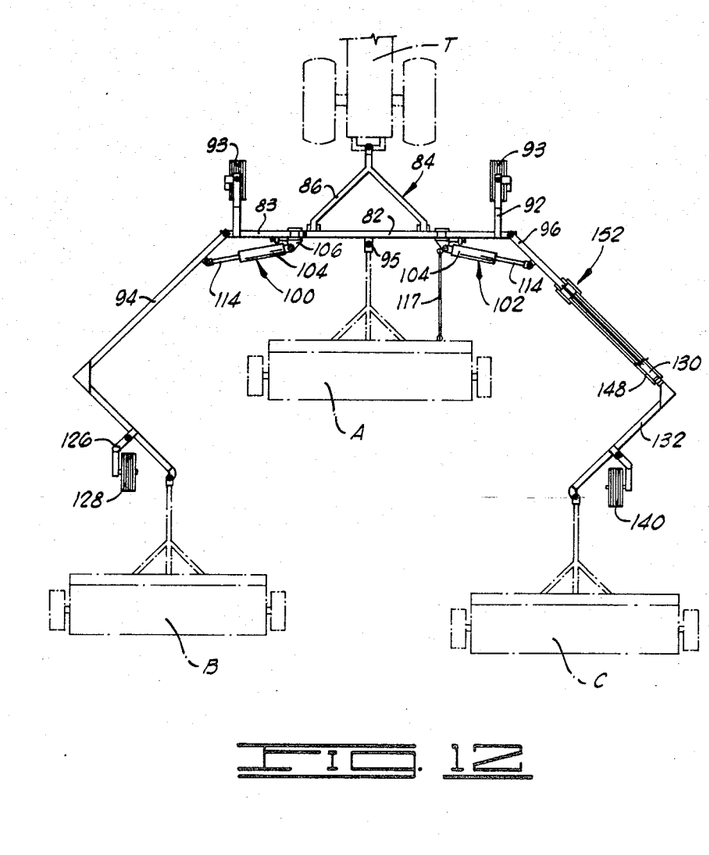
FIG. 12 is a plan view of the structures illustrated in FIG. 10, but showing the hitch assembly and implements in the status they occupy when the implements are in use in the field.

In FIGS. 11 and 12 of the drawings, there are shown two operating statuses of the embodiment of the invention which has been described in referring to FIGS. 6-9. In FIG. 11, the over-the-road status of the close coupled pulling hitch assembly is depicted, and three agricultural implements A, B and C, such as seed drills or the like, are shown coupled in an in-line array directly behind an agricultural tractor T. It will be noted that in this status of the hitch assembly, the side bar extension 130 is in its fully extended position in relation to the side bar 96, and it will further be noted that the side bars 96 and 94 extend directly rearwardly from, and at a right angle to, the beam 82 forming the transverse draw bar 80.

As has previously been explained, the array of the agricultural implements A, B and C in which they are aligned one behind the other and directly behind the tractor T, as shown in FIG. 11, facilitates the movement of the entire apparatus down a highway, or other heavily travelled thoroughfare, with the occupation of a minimum of transverse space. The overall length of the interconnected structures can be minimized by adjustment of the distance to which the side bar extension 130 is extended from the side bar 96 so that the coupling bar 132 is positioned immediately behind the agricultural implement C. It should be further pointed out that the transverse draw bar 80 may be constructed similarly to the transverse draw bar 10 utilized in the embodiment of the invention depicted in FIGS. 1-5, so that by extension of a movable part of this structural member, the distance which separates the side bars 94 and 96 may be varied to accommodate agricultural implements of varying width if desired. The same adjustability can be made to characterize the coupling bars 120 and 132 as is characteristic of the coupling bar 22 illustrated in FIGS. 1-5.

In FIG. 12 of the drawings, the in-the-field status of the three agricultural implements is illustrated. It will be perceived that, in order to actuate the close coupled pulling hitch assembly to alter it from the status illustrated in FIG. 10 to the status depicted in FIG. 11, the hydraulic cylinders 104 forming portions of the actuating assemblies 100 and 102 are actuated to extend from these cylinders, their respective piston rods 114. This has the effect of pivoting the side bars 94 and 96 outwardly to enlarge the angle between these structural members and the beam 82. Concurrently, the piston rod 144 which is extended from the cylinder 142 is retracted to draw the side bar extension 130 into the side bar 96 until it is fully retracted, and the overall distances which separate the beam 82 from the two coupling bars 120 and 132 are substantially the same. This then places the agricultural implements B and C in a position in which they are substantially abreast of each other, and moves them to a staggered or offset position in relation to the leading implement A. Maximum areal coverage during the soil working operation in the field is thus achieved and, moreover, all of the implements are moved closer to the tractor so that their effect in working the soil can be better observed by the operator of the tractor.

Although certain preferred embodiments of the present invention have been herein described and are illustrated in the drawings, it will be understood that various changes and innovations can be effected in the described and illustrated structures without departure from the basic principles which underlie the invention. Changes and innovations of this type are therefore deemed to be circumscribed by the spirit and scope of the invention except as the same may be necessarily limited by the appended claims or reasonable equivalents thereof.

What is claimed is:

1. A close coupled pulling hitch assembly comprising:

elongated, substantially horizontally extending transverse draw bar means;

hitch means on said draw bar means for connecting said draw bar means to a self-propelled vehicle;

first coupling means on said draw bar means for connecting an agricultural implement to said draw bar means;

at least one elongated, substantially horizontally extending side bar means pivotally connected to said transverse draw bar means at a point spaced longitudinally along said elongated draw bar means from said coupling means for pivotation about a vertical axis;

elongated, substantially horizontally extending coupling bar means connected to and movable with each of said side bar means, said coupling bar means being connected to said side bar means at a point spaced longitudinally along said side bar means from said transverse draw bar means;

additional coupling means on each of said coupling bar means for coupling an agricultural implement to the respective coupling bar means;

means for automatically pivoting each of said side bar means about a vertical axis at its point of pivotal connection to said transverse draw bar means for varying the angle between said draw bar means and the respective side bar means; and wheel means connected to at least one of said bar means for supporting said hitch assembly above the ground.

2. A hitch assembly as defined in claim 1 wherein said hitch means is pivotally connected to said draw bar means for pivotation about a vertical axis;

and wherein said hitch assembly is further characterized in including means for automatically pivoting said hitch means whereby the point of connection of said self-propelled vehicle in relation to said draw bar means may be selectively and automatically varied.

3. A hitch assembly as defined in claim 2 wherein said wheel means includes a wheel secured to said hitch means and movable in pivotation therewith about said vertical axis.

4. A hitch assembly as defined in claim 1 wherein said pulling hitch assembly is characterized in having a pair of sapced elongated side bar means, each of said side bar means being pivotally connected at one of its ends to one end of said draw bar means.

5. A hitch assembly as defined in claim 4 wherein one of said side bar means is substantially longer than the other of said side bar means whereby a first agricultural implement can be positioned between said draw bar means and the coupling bar means connected to said other of side bar means, and a second agricultural implement can be positioned between the coupling bar means connected to said pair of side bar means.

6. A hitch assembly as defined in claim 4 wherein said hitch means comprises a Y-shaped yoke member pivotally connected at two horizontally spaced points to said transverse draw bar means for pivotation about horizontal axes at said horizontally spaced points.

7. A hitch assembly as defined in claim 4 wherein one of said elongated side bar means includes a pair of rigid structural members slidably engaging each other for altering the overall length of said one elongated side bar means; and piston and cylinder means for automatically moving one of said rigid structural members relative to the other of said rigid structural members to selectively adjust the length of said one elongated side bar means.

8. A hitch assembly as defined in claim 7 and further characterized as including conduit means extending along said one side bar means to said piston and cylinder means for supplying hydraulic fluid to said piston and cylinder means for the actuation thereof; and means for automatically continuously preventing the occurrence of slack in said hydraulic conduits as said first structural member is moved relatively to said second structural member.

9. A hitch assembly as defined in claim 1 wherein each of said side bar means comprises a tubular end portion slidably receiving a portion of said coupling bar means, whereby the distance between said draw bar means and said coupling bar means can be selectively varied.

10. A hitch assembly as defined in claim 1 wherein said draw bar means comprises:

a first beam having an end portion pivotally connected to one of said side bar means; and a second beam aligned with said first beam and having an end rotatably connected to said first beam for relative rotational movement of said first and second beams relative to each other about aligned longitudinal axes thereof.

11. A hitch assembly as defined in claim 1 wherein said draw bar means comprises:

first beam means having said hitch means connected thereto; and second beam means slidably engaging said first beam means and extensible therefrom for selectively varying the length of said draw bar means, said second beam means having said coupling means connected thereto.

12. A hitch assembly as defined in claim 1 wherein said hitch means comprises:

a hitch arm pivotally connected to said draw bar means for pivotation about a vertical axis;

a hitch bracket pivotally connected to said hitch arm for pivotation about a horizontal axis; and means connected between said hitch arm and said draw bar means for pivoting said hitch arm and hitch bracket in a horizontal direction.

13. A hitch assembly as defined in claim 12 and further characterized as including a cantilevered wheel supporting arm secured to said hitch arm for movement therewith; and a caster wheel mounted on said cantilevered wheel support arm.

14. A hitch assembly as defined in claim 13 wherein said wheel means is further characterized in including a second caster wheel connected to said transverse draw bar means; and a wheel pivotally mounted on each of said coupling bar means.

15. A hitch assembly as defined in claim 1 wherein said wheel means comprises a caster wheel cantilevered from said hitch means and movable with said hitch means relative to said draw bar means.

16. A hitch assembly as defined in claim 1 wherein said wheel means comprises:

a pair of wheels mounted on said draw bar means; and a wheel swivelly connected to each of said coupling bar means for swivelling movement in a horizontal direction.

17. A hitch assembly as defined in claim 1 wherein each of said coupling bar means comprises:

a coupling bar; and a coupling bar extension slidably engaging said coupling bar and aligned therewith for selective adjustment of the length of said elongated coupling bar means.

18. A hitch assembly as defined in claim 1 wherein each of said coupling bar means comprises:

a coupling bar; and a coupling bar projection secured to, and extending substantially normal to, said coupling bar, said coupling bar projection slidably engaging one of said side bar means to facilitate selective adjustment of the distance between said draw bar means and said coupling bar.

19. A hitch assembly as defined in claim 1 and further characterized as including an elongated stabilizer bar connected to said draw bar means and adapted for securement to an agricultural implement connected to said draw bar means.

* * * * *